United States Patent [19]

Straub

[11] Patent Number: 5,280,969
[45] Date of Patent: Jan. 25, 1994

[54] PIPE COUPLING

[75] Inventor: Immanuel Straub, Wangs, Switzerland

[73] Assignee: Straub Federnfabrik AG, Wangs, Switzerland

[21] Appl. No.: 716,139

[22] Filed: Jun. 17, 1991

[30] Foreign Application Priority Data

Jun. 18, 1990 [CH] Switzerland ............... 02024/90

[51] Int. Cl.$^5$ ............................................. F16L 17/03
[52] U.S. Cl. ................................. 285/105; 285/112; 285/373; 285/383
[58] Field of Search ............... 285/373, 112, 104, 105, 285/108, 383

[56] References Cited

U.S. PATENT DOCUMENTS

| | | | |
|---|---|---|---|
| 2,184,376 | 12/1936 | Beyer et al. | 285/110 X |
| 2,272,811 | 2/1942 | Nathan | 285/110 X |
| 2,398,399 | 4/1946 | Alexander | 285/110 X |
| 2,445,151 | 7/1948 | Newell | 285/373 |
| 2,635,901 | 4/1953 | Osborn | 285/112 X |
| 2,939,729 | 6/1960 | O'Shaughnessy, Jr. | 285/112 X |
| 2,971,781 | 2/1961 | Torres | 285/373 X |
| 3,065,005 | 11/1962 | Hall, Sr. et al. | 285/318 X |
| 3,250,331 | 5/1966 | Boyle | 285/318 X |
| 3,456,963 | 7/1969 | Dillon | 285/112 X |
| 3,730,562 | 5/1973 | Viazzi | 285/110 |
| 3,877,733 | 4/1975 | Straub. | |
| 4,147,383 | 4/1979 | Schluter | 285/373 |
| 4,239,242 | 12/1980 | Burns | 285/111 |
| 4,240,654 | 12/1980 | Gladieux | 285/321 X |
| 4,606,564 | 8/1986 | Kurachi | 285/318 X |
| 4,629,217 | 12/1986 | Straub. | |
| 4,644,422 | 5/1987 | Straub. | |
| 4,715,626 | 12/1987 | Gehring et al.. | |
| 4,834,398 | 5/1989 | Guzowski et al. | 285/110 X |

FOREIGN PATENT DOCUMENTS

| | | | |
|---|---|---|---|
| 41660/64 | 9/1965 | Australia. | |
| 58053/86 | 12/1986 | Australia. | |
| 0484214 | 6/1952 | Canada | 285/318 |
| 0695250 | 9/1964 | Canada | 285/112 |
| 0057373 | 8/1982 | European Pat. Off.. | |
| 0175856 | 4/1986 | European Pat. Off.. | |
| 0186728 | 7/1986 | European Pat. Off.. | |
| 1031066 | 5/1958 | Fed. Rep. of Germany | 285/112 |
| 0021618 | 2/1979 | Japan | 285/112 |
| 80206516 | 11/1991 | Taiwan. | |

OTHER PUBLICATIONS

Military Standardized Handbook—Plastics MIL-HDBK-700 [MR] Nov. 1, 1965 pp. 43, 44.
McMaster-Carr Supply Company Catalog.

*Primary Examiner*—Randolph A. Reese
*Assistant Examiner*—Heather Chun
*Attorney, Agent, or Firm*—Willian Brinks Hofer Gilson & Lione

[57] ABSTRACT

A pipe coupling having an elastomer sealing sleeve which is approximately C-shaped in cross-section has a cylindrical housing which is split in the longitudinal direction, and which defines inwardly bent end walls and can be constricted like a pipe clip by means of a closure having tensioning screws, in which arrangement the sleeve, which is enclosed at the end faces and at the circumference by the housing and by a metal insert sheet bridging the housing gap and is approximately C-shaped in cross-section, is compressed in the circumferential direction and is brought to bear against the pipes to be coupled. Sliding rings, which are compressible in the circumferential direction, are located between the end faces of the sleeve and the end walls of the housing. Upon assembly of the coupling, these sliding rings are brought to bear against the outer walls of the pipes and form a sliding seat with the latter. This leads to increased insensitivity to changes with regard to the relative position of the sealing parts and the parts to be sealed, as well as to further increases in the existing adaptability of the coupling to irregular pipes.

13 Claims, 3 Drawing Sheets

PIPE COUPLING

CROSS REFERENCE TO RELATED PATENT APPLICATION

This patent specification is related to a copending patent application entitled "Pipe Coupling" naming the same inventor, filed on the same date as the present specification, and identified U.S. patent application Ser. No. 07/716,139 is hereby incorporated by reference herein.

BACKGROUND OF THE INVENTION

This invention relates to a pipe coupling of the type comprising an elastomer sealing sleeve which is approximately C-shaped in cross section and which defines sealing lips which extend toward each other and are each supported on a sleeve web by means of an annular bead; a housing which surrounds the sleeve and defines radial end walls and a longitudinal gap; a closure which comprises tensioning bolts operative to constrict the housing; and an insert sheet which is inserted between the sleeve and the housing and bridges the longitudinal gap; wherein the sealing lips of the seal define first, larger dimensions before the housing is constricted; and wherein it is possible for the sealing lips to be compressed in the circumferential direction and to be pressed snugly onto a pipe wall due to compression of the annular beads as the housing is constricted.

Pipe couplings of this type, as shown, for example, in German Patent Specification 2,428,101 and corresponding U.S. Pat. No. 3,877,733, have revolutionized pipe connection technology. On the one hand, due to the fact that the sealing lips have larger dimensions in relation to the nominal diameter of the pipes to be connected prior to assembly, it is possible for the couplings to be pushed onto the pipes and installed together with the pipes, it being possible for the pipes simply to be placed next to one another and for the couplings then to be pushed over the joints. On the other hand, the compression of the lip seal in the circumferential direction due to the constrictable housing leads to the fact that the radial thickness of the sleeve increases so that the sleeve is not only pressed against the pipe wall by the housing, but the sleeve tends to mold itself to the pipe surface. This results in fully satisfactory sealing, even in the case of a rough or irregular pipe surface, and additionally in a sealing capability which remains intact for a long time.

The object of the present invention is to improve the known pipe coupling in such a way that the constrictability of the housing is utilized (1) to increase the ability to accommodate changes in the relative position of the sealing parts and the parts to be sealed, and (2) to improve the adaptability, which exists anyway, of the coupling to irregular pipes.

SUMMARY OF THE INVENTION

According to this invention, a pipe coupling of the type described initially above is provided with a sliding ring disposed adjacent an annular gap remaining in the assembled state of the coupling between one of the radial end walls of the coupling housing and the pipe wall, which sliding ring can be compressed in the circumferential direction, and which, bearing against the respective radial end wall, can be brought to bear on the pipe by the coupling housing to form a sliding seat with the pipe.

By virtue of the sliding rings, the sleeve is located in a space which is also closed off at the end faces; the wall thickness in the root area connecting the sealing lips to the sleeve web can therefore be restricted to a minimum or, conversely, reinforcements which adjoin this root area in the axial direction and are in the form of thickened portions can be dispensed with. At a given distance between the sealing edges of the sealing lips, the sleeve—measured in the axial direction—becomes slimmer, whereas, conversely, its flexing capacity in the root area is increased. In the event of relative movements of the pipes due to expansion, this has a particularly favorable effect: when the pipes extend into the coupling, the sleeve offers correspondingly less resistance; if the pipes retract, the sliding rings prevent sleeve material from being taken along into the annular gap which must remain between the radial end walls of the coupling housing and the pipe wall, in order to avoid any contact between the latter and the coupling housing. Accordingly, since the annular gap no longer must be restricted to the absolute minimum, the adaptability of the coupling to irregular pipes, e.g. pipes which have become oval, is increased. This also applies when the pipes are not exactly in alignment with one another or if they move into an angled position after assembly of the coupling, since the lip form, the lip size and the lip spacing can be optimized for sealing and, in addition, there is no need for an excessive amount of material or a larger size. The corresponding pliability naturally reduces the wear due to expansion and increases the service life of the sleeve. The compressive strength of the coupling also increases, since the sliding rings act as supporting rings even under high pressure and as wiper rings in the gap area in the event of expansion. The sliding seat between the pipe wall and the sliding rings, together with the compressibility or the compression of the sliding rings by the housing, can also be permanently ensured by the sleeve having at each of its end faces an extension snugly enclosing the sliding ring, which extension can in addition have a cross-section tapering to the outside, the sliding ring forming together with the housing an annular space of corresponding profile. This leads the prestressing of the compressed sleeve material or the internal pressure to act in the annular space, and the expansion of the coupling housing due to heat is thereby compensated. In this case, too, the sliding rings act as a type of ring stop, preventing the excessive squeezing of the sleeve in the sealing-lip/bead area.

BRIEF DESCRIPTION OF THE DRAWINGS

Design examples of the subject of the invention are illustrated in the drawings, in which.

DETAILED DESCRIPTION OF THE PRESENTLY PREFERRED EMBODIMENTS

Figure 1:
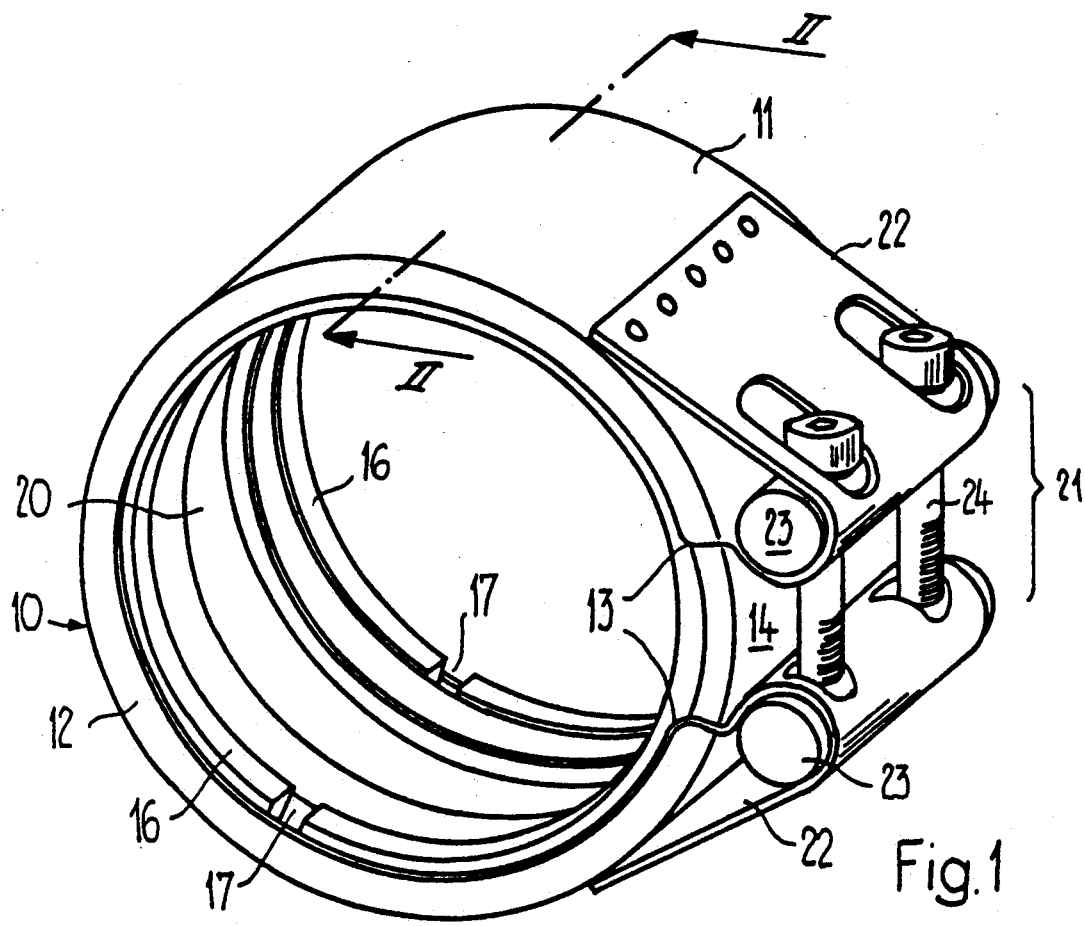
FIG. 1 shows a perspective illustration of a preassembled coupling having a housing, still opened out, with an uncompressed sleeve and a pair of sliding rings, likewise not yet compressed.

The housing 10 illustrated in FIG. 1 is split along its length and has a cylindrical jacket II and inwardly bent end walls 12. A metal insert sheet 14 bridges the housing gap 13 and is of analogous design. Sliding rings 16 constructed as snap rings are provided in such a way as to bear against the inside of the bent end walls 12 of the housing or of the metal insert sheet 14. The gap 17 of the sliding rings 16 is still open in the illustrated pre-assembled state of the coupling. In this embodiment, the sliding rings 16 are advantageously made of a high molecular weight, natural or synthetic compressible material, preferably polyethylene, it being possible for them to have, for example, the trapezoidal cross-sectional profile shown in FIG. 2. This results in a wedge-shaped space 18, open axially inward, between the cylindrical jacket 11 of the housing and the circumference of each of the sliding rings, in which space 18 and end-face extension 19 of the sleeve 20 engages, which sleeve 20 is located between the sliding rings and is approximately C-shaped in cross-section. The sliding rings are thus always enclosed by this annular extension of the sleeve, although the gap 17 of the sliding rings is still open when the coupling is in the pre-assembled, opened-out state.

Figure 2:
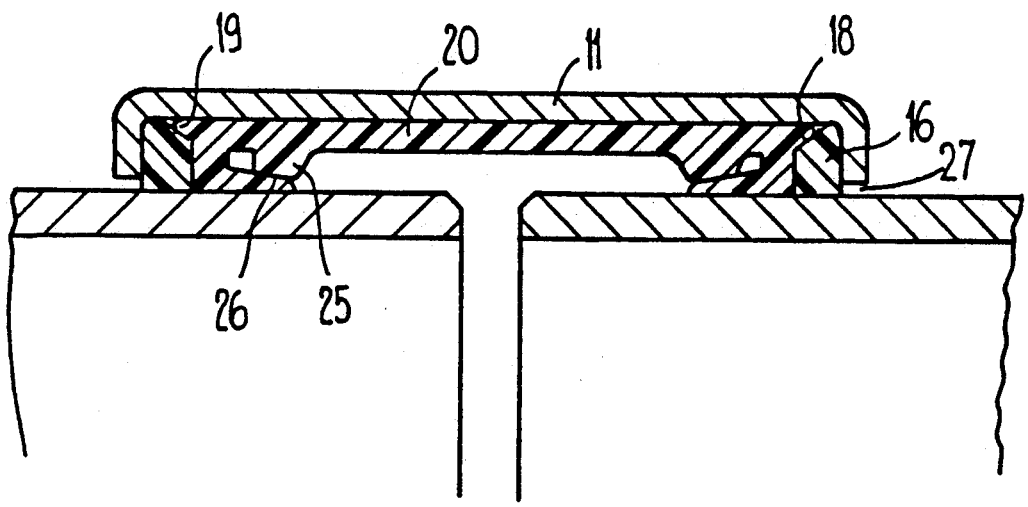
FIGS. 2-9 show various profile variants in axial section along the line II—II in FIG. 1.
Figure 3:
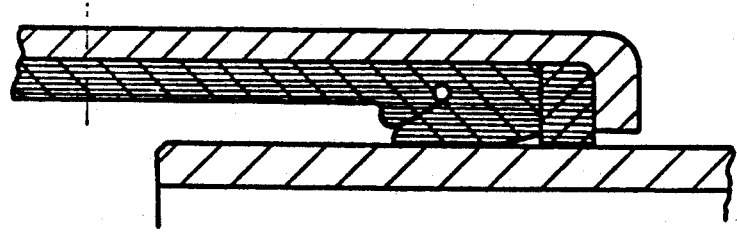
Figure 4:
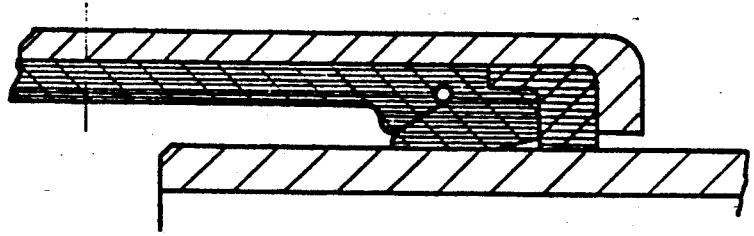
Figure 5:
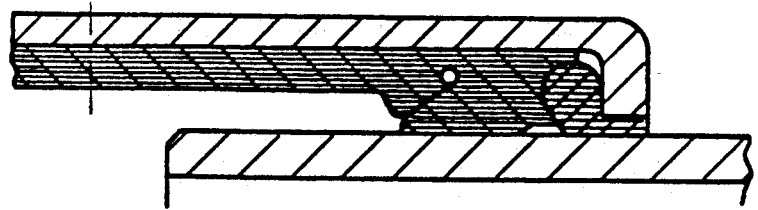
Figure 6:
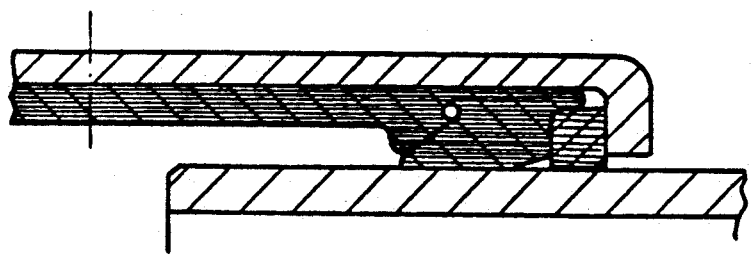
Figure 7:
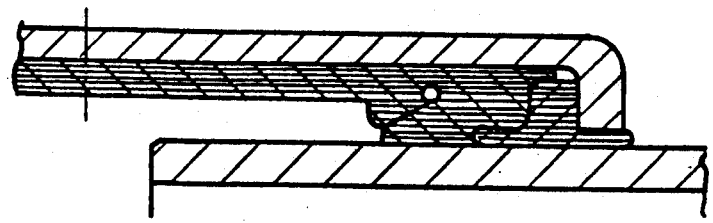
Figure 8:
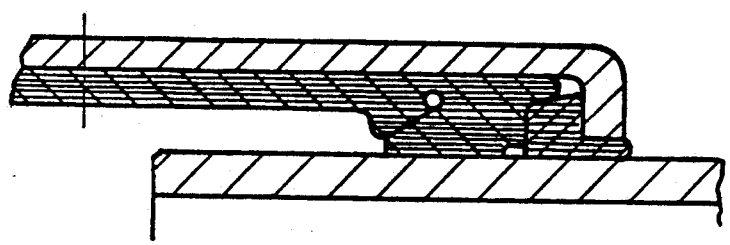

The housing 10 has a closure 21, consisting of tensioning straps 22 welded to the housing, tensioning bars 23 enclosed by these tensioning straps 22, and tensioning screws 24. In the state shown in FIG. 1, the inside width of the coupling (housing, sleeve, sliding rings) is amply dimensioned so as always to be larger compared with the outside diameter of the pipes to be coupled, so that the coupling can easily be pushed over one pipe and, after the pipes are installed, can also be pushed across onto the other pipe end. After the two tensioning screws 24 are tightened, the inside diameter of the entire housing 10 can be reduced as in the case of a pipe clip, the longitudinal gap 13 of the housing being reduced and the metal insert sheet 14 plunging more and more into the housing. Here, the sleeve 20 is compressed in the circumferential direction, the beads 25 molded onto the sleeve web bringing the sealing lips 26 to bear snugly on the pipe wall, as shown in FIG. 2. The sliding rings are also constricted, and are dimensioned in such a way that their gap 17 closes just before they come to bear against the pipe wall. As the screws are tightened further, the sliding rings, like the sleeve up to this point, are compressed, in which process they have considerably less compressibility, due to the material, than the sleeve. Provision is of course made for the sliding rings to bear against the outer wall of the pipes. The sliding seat is retained by the (compressed) extensions of the sleeve engaging in the wedge-shaped space between the sliding rings and the cylindrical jacket of the housing. The internal pressure of the sealed medium also produces via the extensions a radial contact pressure of the sliding rings against the pipe wall, thereby compensating for any radial expansion of the housing, for example, as a result of pressure or the action of heat.

It follows from FIG. 2 that the annular gap 27 between the end walls 12 of the housing 10 and the pipe walls is closed by the sliding rings so that the gap width can be considerable and contact between the coupling housing and the pipe wall can be reliably avoided.

Figure 9:
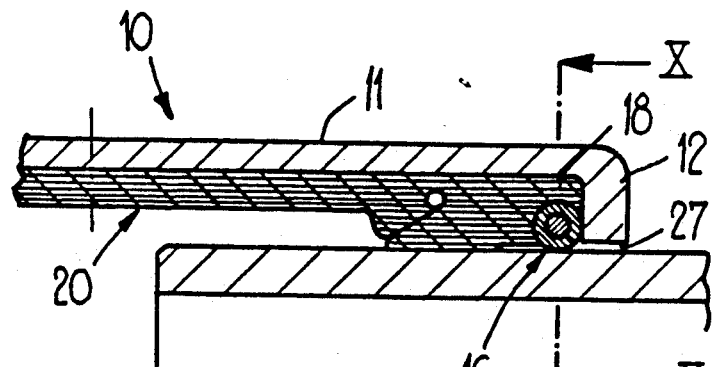

The profiles of the sliding rings illustrated in FIGS. 3-8 can be readily understood. Therefore only the embodiment according to FIGS. 9 and 10 is to be particularly described below.

Figure 10:
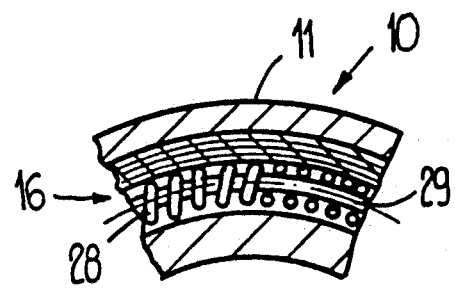
FIG. 10 shows a cross-section along the line X—X in FIG. 9.

FIG. 10 shows a sliding ring in the form of a helical spring 28 which, bent to form an (open) ring, is inserted into the coupling housing, the coils not yet bearing against one another in the pre-assembled state of the coupling. A snap ring 29 made of wire engages from both ends in the helical spring 28 and forms a type of closure which connects the two ends of the helical spring together to form a sliding ring. The snap ring 29 has larger dimensions compared with the housing 10, which is still opened out. The arrangement is such that, when the tensioning screws are tightened and the housing is constricted, the sliding ring 28, 29 is constricted, the coils of the helical spring drawing closer, if need be touching, in the final state. Of course, the snap ring 29 supports the coils of the helical spring 28 in every phase to prevent upsetting. In this embodiment too, the sleeve 20 has annular extensions 18 which enclose the sliding rings 28, 29 so that the latter, as explained above, always remain seated in sliding engagement on the pipe wall. As in other sliding-ring variants of corresponding profile, here too, the internal pressure is fully effective in the axial direction and the sliding rings accordingly press snugly against the end walls 12 of the housing, while only a reduced contact pressure acts in the radial direction via the annular extensions 18 of the sleeve, so that even coated pipes are not affected by the sliding seat.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a pipe coupling of the type comprising an elastomer sealing sleeve which is approximately C-shaped in cross-section and defines sealing lips which extend toward each other and are each supported on a sleeve web by means of an annular bead; a housing comprising a cylindrical jacket which surrounds the sleeve and which defines radial end walls and a longitudinal gap, said housing further comprising an insert sheet which is inserted between the sleeve and the jacket and which bridges the longitudinal gap; and a closure comprising tensioning bolts operative to constrict the housing; wherein the sealing lips of the sleeve define first, larger dimensions before the housing is constricted, and wherein it is possible for said sealing lips to be compressed in the circumferential direction and to be pressed snugly onto respective pipe walls due to compression of the annular beads as the housing is constricted; the improvement comprising:

means for forming a sliding seat between the pipe coupling and the pipe walls after the housing is constricted to permit axial displacement of the pipe walls with respect to the housing, said means comprising a ring inserted on each side between the sealing sleeve and the respective radial end wall of the housing, said ring being compressible in the circumferential direction and defining an inwardly directed sliding surface, wherein said sliding surface defines first, larger dimensions before the housing is constricted, and wherein said sliding surfaces are configured to bear on the pipe to form a sliding seat with the pipe as the housing is compressed.

2. The pipe coupling as claimed in claim 1, wherein the sleeve defines an extension snugly enclosing the ring.

3. The pipe coupling as claimed in claim 2, wherein the extension defines a cross-section tapering to the outside, and wherein the ring forms together with the housing an annular space of corresponding profile.

4. The pipe coupling as claimed in claim 1, wherein the sliding ring is made of a compressible material.

5. The pipe coupling as claimed in claim 4, wherein the ring is made of polyethylene.

6. The pipe coupling as claimed in claim 1, wherein the ring comprises a snap ring that defines two ends separated by a slit, and wherein the slit closes directly before the housing is tightened to a final position.

7. The pipe coupling as claimed in claim 1, wherein the ring comprises a helical spring having coils bearing tightly after compression, and a wire-shaped snap ring which engages in the helical spring.

8. The pipe coupling as claimed in claim 7, wherein the snap ring has larger dimensions in relation to the width of the housing before constriction of the housing.

9. In a pipe coupling of the type comprising an annular elastomer sealing sleeve which is approximately C-shaped in cross-section and defines annular sealing lips which extend toward each other and are each supported on an annular sleeve web by means of an annular bead; a housing comprising a cylindrical jacket which surrounds the sleeve and which defines radial end walls and a longitudinal gap; a closure comprising tensioning bolts operative to constrict the housing; and an insert sheet which is inserted between the sleeve and the housing and bridges the longitudinal gap, wherein the sealing lips of the sleeve define first, larger dimensions before the housing is constricted, and wherein it is possible for said sealing lips to be compressed in the circumferential direction and to be pressed snugly onto a pipe wall due to compression of the annular beads as the housing is constricted; the improvement comprising:

a ring inserted on each side between the sealing sleeve and the respective radial end wall of the housing, said ring being compressible in the circumferential direction and defining an inwardly directed sliding surface, wherein said sliding surface defines first, larger dimensions before the housing is constricted, and wherein said sliding surfaces are configured to bear on the pipe to form a sliding seat with the pipe as the housing is compressed;

wherein the sleeve defines an extension snugly enclosing the ring.

10. The pipe coupling as claimed in claim 9 wherein the extension defines a cross-section tapering to the outside, and wherein the ring forms together with the housing an annular space of corresponding profile.

11. In a pipe coupling of the type comprising an elastomer sealing sleeve which is approximately C-shaped in cross-section and defines sealing lips which extend toward each other and are each supported on a sleeve web by means of an annular bead; a housing comprising a cylindrical jacket which surrounds the sleeve and which defines radial end walls and a longitudinal gap; a closure comprising tensioning bolts operative to constrict the housing; and an insert sheet which is inserted between the sleeve and the housing and bridges the longitudinal gap, wherein the sealing lips of the sleeve define first, larger dimensions before the housing is constricted, and wherein it is possible for said sealing lips to be compressed in the circumferential direction and to be pressed snugly onto a pipe wall due to compression of the annular beads as the housing is constricted; the improvement comprising:

a ring inserted on each side between the sealing sleeve and the respective radial end wall of the housing, said ring being compressible in the circumferential direction and defining an inwardly directed sliding surface, wherein said sliding surface define first, larger dimensions before the housing is constricted, and wherein said sliding surfaces can be brought as the housing is compressed to bear on the pipe to form a sliding seat with the pipe;

wherein the ring comprises a snap ring that defines two ends separated by a slit, and wherein the slit closes directly before the housing is tightened to a final position.

12. In a pipe coupling of the type comprising an elastomer sealing sleeve which is approximately C-shaped in cross-section and defines sealing lips which extend toward each other and are each supported on a sleeve web by means of an annular bead; a housing comprising a cylindrical jacket which surrounds the sleeve and which defines radial end walls and a longitudinal gap; a closure comprising tensioning bolts operative to constrict the housing; and an insert sheet which is inserted between the sleeve and the housing and bridges the longitudinal gap, wherein the sealing lips of the sleeve define first, larger dimensions before the housing is constricted, and wherein it is possible for said sealing lips to be compressed in the circumferential direction and to be pressed snugly onto a pipe wall due to compression of the annular beads as the housing is constricted; the improvement comprising:

a ring inserted on each side between the sealing sleeve and the respective radial end wall of the housing, said ring being compressible in the circumferential direction and defining an inwardly directed sliding surface, wherein said sliding surface defines first, larger dimensions before the housing is constricted, and wherein said sliding surfaces can be brought as the housing is compressed to bear on the pipe to form a sliding seat with the pipe;

wherein the ring comprises a helical spring having coils bearing tightly after compression, and a wire-shaped snap ring which engages in the helical spring;

wherein the snap ring has larger dimensions in relation to the width of the housing before constriction of the housing.

13. A method for coupling two pipes comprising the following steps:

a) providing a pipe coupling of the type comprising an elastomer sealing sleeve which is approximately C-shaped in cross-section and defines sealing lips which extend toward each other and are each supported on a sleeve web by means of an annular bead; a housing comprising a cylindrical jacket which surrounds the sleeve and which defines radial end walls and a longitudinal gap; a closure comprising tensioning bolts operative to constrict the housing; and an insert sheet which is inserted between the sleeve and the housing and bridges the longitudinal gap, wherein the sealing lips of the sleeve define first, larger dimensions before the housing is constricted, and wherein it is possible for said sealing lips to be compressed in the circumferential direction and to be pressed snugly onto a pipe wall due to compression of the annular beads as the housing is constricted; said pipe coupling further comprising a ring inserted on each side between the sealing sleeve and the respective radial end wall of the housing, said ring being compressible in the circumferential direction and defining an inwardly directed sliding surface, wherein said sliding surface defines first, larger dimensions before the housing is constricted, and wherein said sliding surfaces can be brought as the housing is compressed to bear on the pipe to form a sliding seat with the pipe.

b) positioning the pipe coupling around and over a pair of aligned pipes with each sealing lip aligned with a respective pipe; and c) tightening the tensioning bolts to constrict the housing, thereby pressing the sealing lips snugly onto the respective pipe walls; and (d) forming sliding seats between the sliding surfaces and the pipe walls during step (c) by compressing the rings in the circumferential direction to being the sliding surfaces to bear on the respective pipes.

* * * * *